Oct. 11, 1927.

J. W. COLLIER 1,645,416

FOLDABLE SUNSHADE FOR AUTOMOBILES

Filed April 30, 1926

Inventor
J. W. Collier
By Clarence A. O'Brien
Attorney

Patented Oct. 11, 1927.

1,645,416

UNITED STATES PATENT OFFICE.

JOHN W. COLLIER, OF AUGUSTA, GEORGIA.

FOLDABLE SUNSHADE FOR AUTOMOBILES.

Application filed April 30, 1926. Serial No. 105,727.

My present invention pertains to sun shades and anti-glare devices for automobiles; and it contemplates the provision of an efficient sun shade adapted to render driving comfortable in the late afternoon and in the early morning when an automobile is progressing toward the sun, the shade in working position being also adapted to keep rain off the windshield and to avert glare, and the improvement being so arranged that it does not detract from the finished appearance of the automobile when the sun shade is in pendent working position and is invisible when the sun shade is not in use.

With the foregoing in mind the invention in all of its details will be fully understood from the following description and claims when the same are read in connection with the drawings, accompanying and forming part of this specification, in which:—

Similar numerals of reference designate corresponding parts in both views of the drawings.

Figure 1:
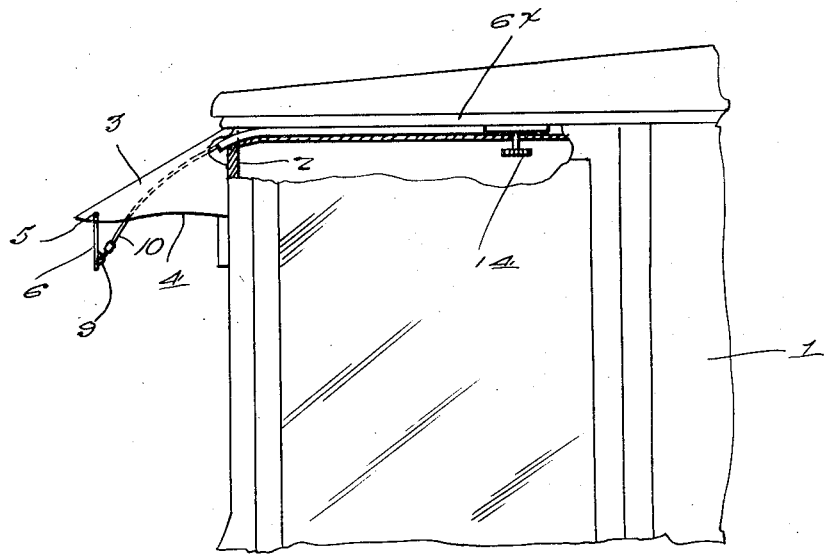
Figure 1 is a view in side elevation and partly in section illustrating the preferred installation of my improvement.
Figure 2:
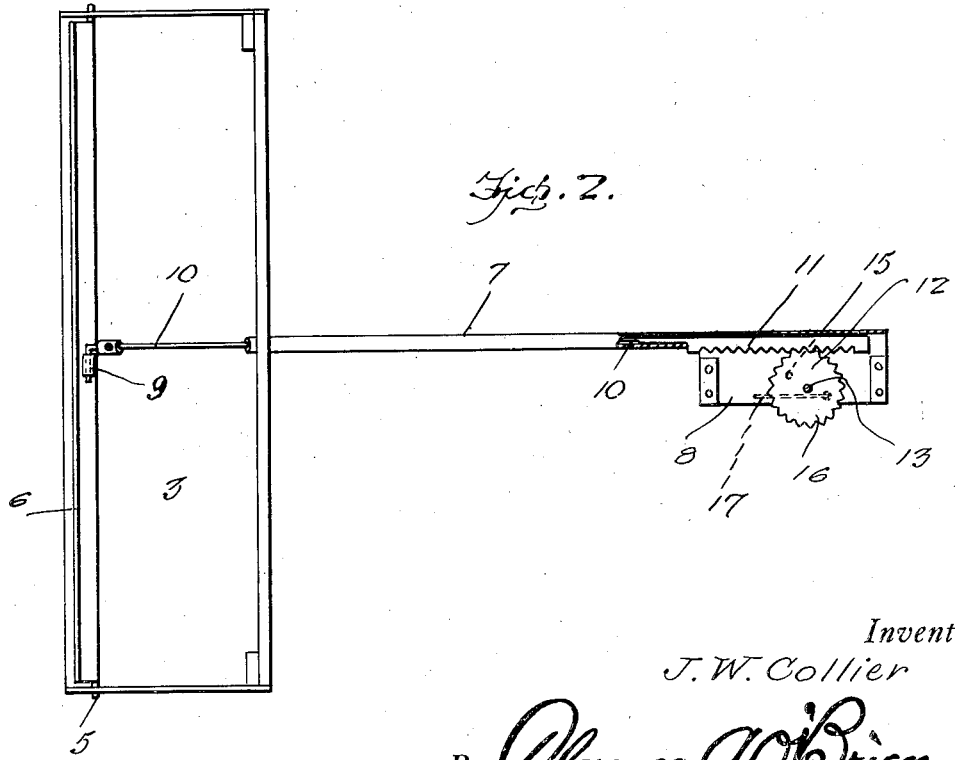
Figure 2 is a view partly in plan and partly in section showing the improvement as arranged relative to the canopy usually employed in front of the upper portion of the windshield of a closed automobile.

I show in Figure 1 a closed automobile body 1 having a front glass or windshield 2, and I also show the usual canopy 3 arranged in front of the upper portion of the glass or windshield 2, the said canopy 3 having the conventional end flanges or depending portions 4.

Hinged at 5 in the forward portion of the canopy 3 is my novel vertically swingable sun shade 6, which, per se, may be of any material and of any construction compatible with the purpose of my invention.

Arranged in the roof or top 6ˣ of the automobile body 1 and preferably in the longitudinal center thereof and so as to be entirely out of the way is a fixed guide sheath 7, the forward end of which is arranged above the upper end of the windshield or front glass 2 as appears in Figure 1.

At its rear end the sheath or guide tube 7 is merged into a casing 8 which is also disposed in the roof or top of the automobile body.

Appropriately connected at 9 to the sun shade 6 is a flexible rod 10 which extends through and is movable endwise in the tube or sheath 7 and is provided at its rear end with a rack bar portion 11. The said rack bar portion 11 is meshed with a spur gear 12, fixed to a shaft 13, vertically arranged and extending downwardly from the top of the body 1. The shaft 13 is equipped with a knurled or other appropriate finger piece 14, and this latter is exposed below the top of the body 1 so as to be convenient for operation, and said finger piece 14 is the only part of my improvement that is disposed within the automobile body 1, and hence it will be appreciated that my improvement does not take up any appreciable space within the body 1 and the major portion of the improvement is entirely out of the way. It will be understood that in effect the sheath or guide tube 7 and the casing 8 are built into the top of the body 1, and it will also be understood that the only part exposed in the automobile body, viz; the finger piece 14 may be nickel plated or otherwise embellished so as to enhance rather than detract from the finished appearance of the automobile body interior.

It will be readily apparent from the foregoing that when it is desired to put the sun shade 6 into use it is simply necessary for the driver within the body 1 to manipulate the finger piece 14 and turn the shaft 13 when the sun shade will be positioned as shown in Figure 1. In said position, the sun shade 6 will efficiently serve the purposes hereinbefore suggested, and when the shaft 13 is returned in reverse direction, the sun shade 6 will be raised to idle position against or adjacent to the top of the canopy 3 where the sun shade and its appurtenances will be entirely hidden by the canopy 3.

The spur gear 12 is provided with indentures or depressions 15 and 16 in one side, and the casing 8 is equipped with a spring 17 connected at one end to the casing and having an angularly disposed terminal portion arranged to work through an aperture in the casing wall and enter the depressions or indentures 15 and 16. Manifestly when the angular terminal portion of the spring strip 17 is in one of the indentures alluded to, the sun shade 6 will be yieldingly retained in pendent working position, and when the angularly disposed terminal of the spring strip 17 is in the other indenture of the spur gear 12 the sun shade 6 will be yieldingly retained in its upper, idle position. In this connection it will be understood that when the angularly disposed terminal of the spring strip 17 is disposed in either of the indentures alluded to, a little stress tied to the finger piece 14 is all that is necessary to bring about the release of the spur gear 12 from the spring strip 17.

Notwithstanding the qualities ascribed to my improvement, it will be appreciated that the improvement is simple and inexpensive in construction, is susceptible of ready installation in automobile bodies, and, in general, is well adapted to withstand the vibrations, shocks and general uses to which automobile appurtenances are ordinarily subjected.

While I prefer the construction illustrated and explicity described, I do not desire to be understood as limiting myself to such specific construction, my invention being defined by my appended claims within the scope of which modifications may be made without effecting or involving departure from my invention.

Having described my invention, what I claim and desire to secure by Letters-Patent, is:—

1. In combination, a closed automobile body having a transparent glass or windshield at its front and also having a canopy in front of the upper portion of said windshield, a movable sun shade carried in the forward portion of the said canopy, a guide sheath or tube carried in the top of the body and disposed longitudinally thereof, a casing also carried above the top of the body and communicating with said sheath or tube, flexible means connected with the sun shade and disposed and movable longitudinally in the guide tube and having a rack bar portion disposed and movable in said casing, a spur gear disposed in said casing, and a shaft fixed to and pendent from said spur gear and having a finger piece disposed under the ceiling of the body.

2. In combination, a closed automobile body having a transparent glass or windshield at its front and also having a canopy in front of the upper portion of said windshield, a movable sun shade carried in the forward portion of the said canopy, a guide sheath or tube carried in the top of the body and disposed longitudinally thereof, a casing also carried above the top of the body and communicating with said sheath or tube, flexible means connected with the sun shade and disposed and movable longitudinally in the guide tube and having a rack bar portion disposed and movable in said casing, a spur gear disposed in said casing, and a shaft fixed to and pendent from said spur gear and having a finger piece disposed under the ceiling of the body; the said spur gear having indentures or depressions spaced apart in the same, and the casing being equipped with spring means adapted to enter said depressions whereby stress applied to the finger piece is necessary to move the sun shade from its working position and also from its idle position.

3. In combination, an automobile body, a swingable sun shade, a longitudinally movable rack bar, a connection between said bar and the sun shade, and a spur gear meshed with the rack bar and having a finger piece for convenient manipulation of said spur gear; the said spur gear being provided with spaced indentures or depressions, and spring means being arranged to enter said depressions and prevent movement of the spur gear and the sun shade except when stress is applied to said finger piece.

In testimony whereof I affix my signature.

JOHN W. COLLIER.